United States Patent
John Wilson et al.

(10) Patent No.: US 10,897,778 B2
(45) Date of Patent: Jan. 19, 2021

(54) USER EQUIPMENT REPORTING OF RECEIVE BEAM CHANGE INDICATION

(71) Applicant: QUALCOMM Incorporated, San Diego, CA (US)

(72) Inventors: Makesh Pravin John Wilson, San Diego, CA (US); Sumeeth Nagaraja, San Diego, CA (US); Sony Akkarakaran, Poway, CA (US); Tao Luo, San Diego, CA (US); Wooseok Nam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 289 days.

(21) Appl. No.: 15/710,941

(22) Filed: Sep. 21, 2017

(65) Prior Publication Data
US 2018/0192438 A1  Jul. 5, 2018

Related U.S. Application Data

(60) Provisional application No. 62/440,391, filed on Dec. 29, 2016.

(51) Int. Cl.
*H04W 74/00* (2009.01)
*H04L 5/00* (2006.01)
(Continued)

(52) U.S. Cl.
CPC ........ *H04W 74/004* (2013.01); *H04B 7/0695* (2013.01); *H04B 7/088* (2013.01);
(Continued)

(58) Field of Classification Search
CPC ... H04W 74/004; H04W 24/10; H04W 48/20; H04W 36/0072; H04W 72/046; H04W 72/085; H04W 16/28; H04W 72/1284; H04W 72/004; H04W 72/006; H04W 72/0833; H04W 48/02; H04W 8/02; H04L 5/0057; H04L 5/0005; H04L 5/0048; H04L 5/1469; H04B 7/088; H04B 7/063;
(Continued)

(56) References Cited

U.S. PATENT DOCUMENTS

| | | | |
|---|---|---|---|
| 2013/0083774 A1 | 4/2013 | Son et al. | |
| 2013/0121185 A1* | 5/2013 | Li | H04W 72/046 370/252 |

(Continued)

FOREIGN PATENT DOCUMENTS

| | | | |
|---|---|---|---|
| EP | 3282594 A1 | 2/2018 | |
| WO | 2016086144 A1 | 6/2016 | |
| WO | WO-2016086144 A1 * | 6/2016 | ........... H04B 7/0617 |

OTHER PUBLICATIONS

International Search Report and Written Opinion—PCT/US2017/066715—ISA/EPO—dated Mar. 2, 2018.

*Primary Examiner* — George Eng
*Assistant Examiner* — Hung K Du
(74) *Attorney, Agent, or Firm* — Patterson & Sheridan, L.L.P.

(57) ABSTRACT

Certain aspects of the present disclosure provide techniques for reporting information regarding receive (Rx) beams used by a user equipment. In some cases, such reporting may indicate a change in Rx beams to be used by the UE for subsequent beamformed transmissions.

28 Claims, 10 Drawing Sheets

(51) Int. Cl.

| | |
|---|---|
| *H04B 7/08* | (2006.01) |
| *H04B 7/06* | (2006.01) |
| *H04W 24/10* | (2009.01) |
| *H04W 48/20* | (2009.01) |
| *H04W 36/00* | (2009.01) |
| *H04L 5/14* | (2006.01) |
| *H04B 7/04* | (2017.01) |
| *H04W 16/28* | (2009.01) |
| *H04W 72/04* | (2009.01) |
| *H04W 72/08* | (2009.01) |

(52) U.S. Cl.
CPC .......... *H04L 5/0005* (2013.01); *H04L 5/0048* (2013.01); *H04W 24/10* (2013.01); *H04W 48/20* (2013.01); *H04B 7/04* (2013.01); *H04B 7/063* (2013.01); *H04L 5/0057* (2013.01); *H04L 5/1469* (2013.01); *H04W 16/28* (2013.01); *H04W 36/0072* (2013.01); *H04W 72/046* (2013.01); *H04W 72/085* (2013.01)

(58) Field of Classification Search
CPC ...... H04B 7/0695; H04B 7/04; H04B 7/0632; H04B 7/0408; H04B 7/0617
See application file for complete search history.

(56) References Cited

U.S. PATENT DOCUMENTS

| | | | |
|---|---|---|---|
| 2013/0155847 A1 | 6/2013 | Li et al. | |
| 2014/0056256 A1 | 2/2014 | Kim et al. | |
| 2014/0198696 A1* | 7/2014 | Li | H04W 52/0229 |
| | | | 370/311 |
| 2016/0344464 A1* | 11/2016 | Kim | H04B 7/0617 |
| 2018/0159600 A1* | 6/2018 | Kim | H04B 7/0658 |
| 2019/0104549 A1 | 4/2019 | Deng et al. | |
| 2019/0312628 A1* | 10/2019 | Bergstrom | H04B 7/086 |
| 2020/0028599 A1* | 1/2020 | Zhang | H04B 7/06 |

* cited by examiner

|  | UE Tx | UE Rx | NB Tx | NB Rx |
|---|---|---|---|---|
| Mesg 1 | UE-B1 | - | - | NB-B1 |
| Mesg 2 + RS1 | - | UE-B1, UE-B1 | NB-B1, NB-B2 | - |
| Mesg 3 | If abs (RSRP(NB-B1, UE-B1) − RSRP(NB-B2, UE-B1)) < *threshold1* then UE may report beam id, rsrp of both beams<br><br>NB may choose eight NB-B1 or NB-B2 for Mesg 4 transmission | | | |
| Mesg 4 | - | UE-B1 | NB-B1, NB-B2 | - |

FIG. 11A

|  | UE Tx | UE Rx | NB Tx | NB Rx |
|---|---|---|---|---|
| Mesg 1 | UE-B1 | - | - | NB-B1 |
| Mesg 2 + RS1 | - | UE-B1, UE-B2 | NB-B1, NB-B2 | - |
| Mesg 3 | If abs (RSRP(NB-B2, UE-B2) − RSRP(NB-B1, UE-B1)) > *threshold1* then UE may report beam id, rsrp of strongest (NB-B2) and explicitly send Rx beam change indication<br><br>NB will select NB-B2 for Mesg 4 transmission | | | |
| Mesg 4 | - | UE-B2 | NB-B2 | - |

FIG. 11B

USER EQUIPMENT REPORTING OF RECEIVE BEAM CHANGE INDICATION

CLAIM OF PRIORITY UNDER 35 U.S.C. § 119

The present application for patent claims benefit of U.S. Provisional Patent Application Ser. No. 62/440,391, filed Dec. 29, 2016, assigned to the assignee hereof and hereby expressly incorporated by reference herein.

BACKGROUND

Field of the Disclosure

Aspects of the present disclosure relate to wireless communications, and more particularly, to reporting a change in receive beam by a user equipment (UE).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure relate to methods and apparatus for using beam sets for mobility management of a UE. Mobility management may refer to beam mobility (e.g., a UE switching from a first active beam to a second active beam) and/or cell mobility, (e.g., a UE switching from a serving BS to a target BS).

Certain aspects of the present disclosure provide a method for wireless communication that may be performed, for example, by a UE. The method generally includes receiving, from a base station (BS) serving the UE, information regarding one or more beam sets, wherein each of the beam sets include one or more reference beams used to transmit a reference signal, receiving, from the BS, one or more mobility parameters, wherein the mobility parameters are associated with the reference beams and one or more mobility event triggers, detecting a mobility event based, at least in part, on the mobility parameters, and taking one or more actions based, at least in part, on the detected mobility event.

Aspects generally include methods, apparatus, systems, computer readable mediums, and processing systems, as substantially described herein with reference to and as illustrated by the accompanying drawings.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 11A and 11B illustrate an example of Rx beam measurement reporting, in accordance with aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
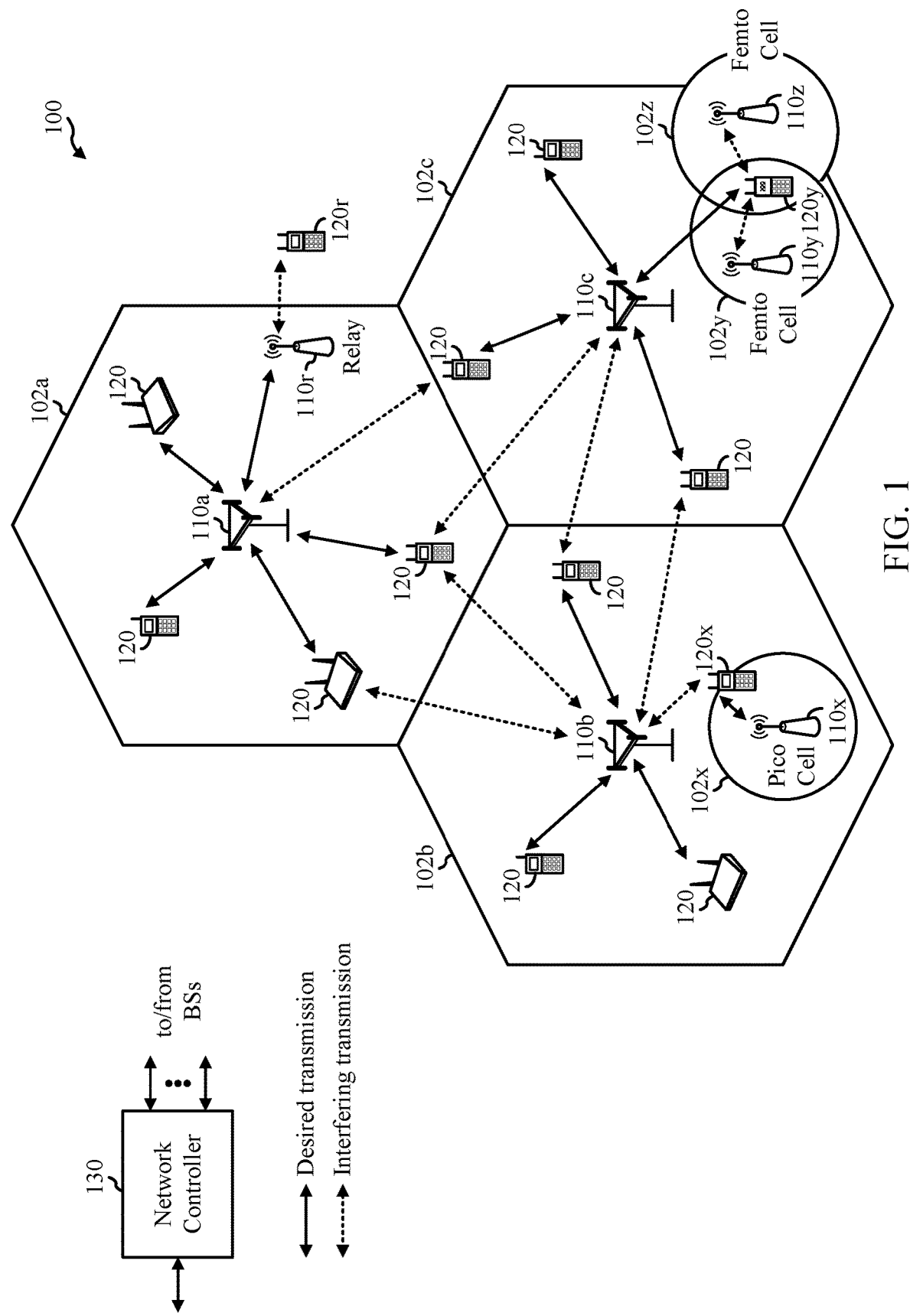
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure may be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. As described herein, a BS may monitor active beams using measurements of reference signals (e.g., NRS, SSS, DMRS, MRS, CSI-RS, synch) transmitted via reference beams.

Figure 8:
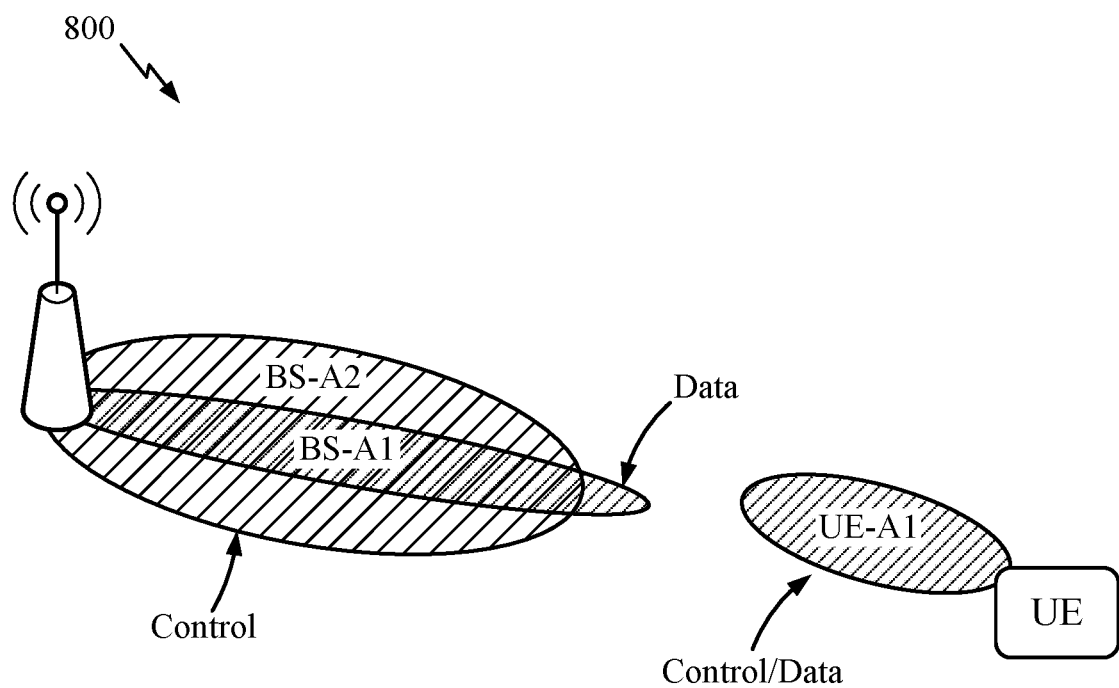
FIG. 8 illustrates an example of active beams, in accordance with certain aspects of the present disclosure.

As will be described in more detail herein, and as illustrated in FIG. 8, active beams may include control beams and data beams. Sets of active beams may have different functionalities, requirements, and characteristics. Given some of these differences, defining one set of cell mobility parameters or beam mobility parameters for a wireless system employing beams may be resource inefficient, provide inaccurate event triggers, cause unnecessary mobility of a UE. Thus, aspects of the present disclosure provide beam sets and mobility parameters associated with each beam set. The mobility parameters may be used to detect an event trigger for beam or cell mobility.

Because the functionalities and characteristics of beams may be different, aspects of the present disclosure may advantageously make mobility decisions based on parameters specific to a beam set. Accordingly, the UE report more accurate event triggers because mobility parameters may be specific to a beam set, consume less power by taking measurements associated with the mobility parameters for a beam set, and reduce signaling to a BS, by signaling event triggers associated with defined mobility parameters for a beam set.

UEs 120 may be configured to perform the operations 1000 and methods described herein for detecting a mobility events based, at least in part, on mobility parameters associated with a beam set. BS 110 may include a transmission reception point (TRP), Node B (NB), 5G NB, access point (AP), new radio (NR) BS, etc.). BS 110 may be configured to perform the operations 900 and methods described herein for configuring beam sets and mobility parameters associated with each of the beam sets. The BS may receive an indication of a detected mobility event based on the mobility parameters and may make a decision regarding mobility management of the UE based on the event trigger.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells may be configured as access cell (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
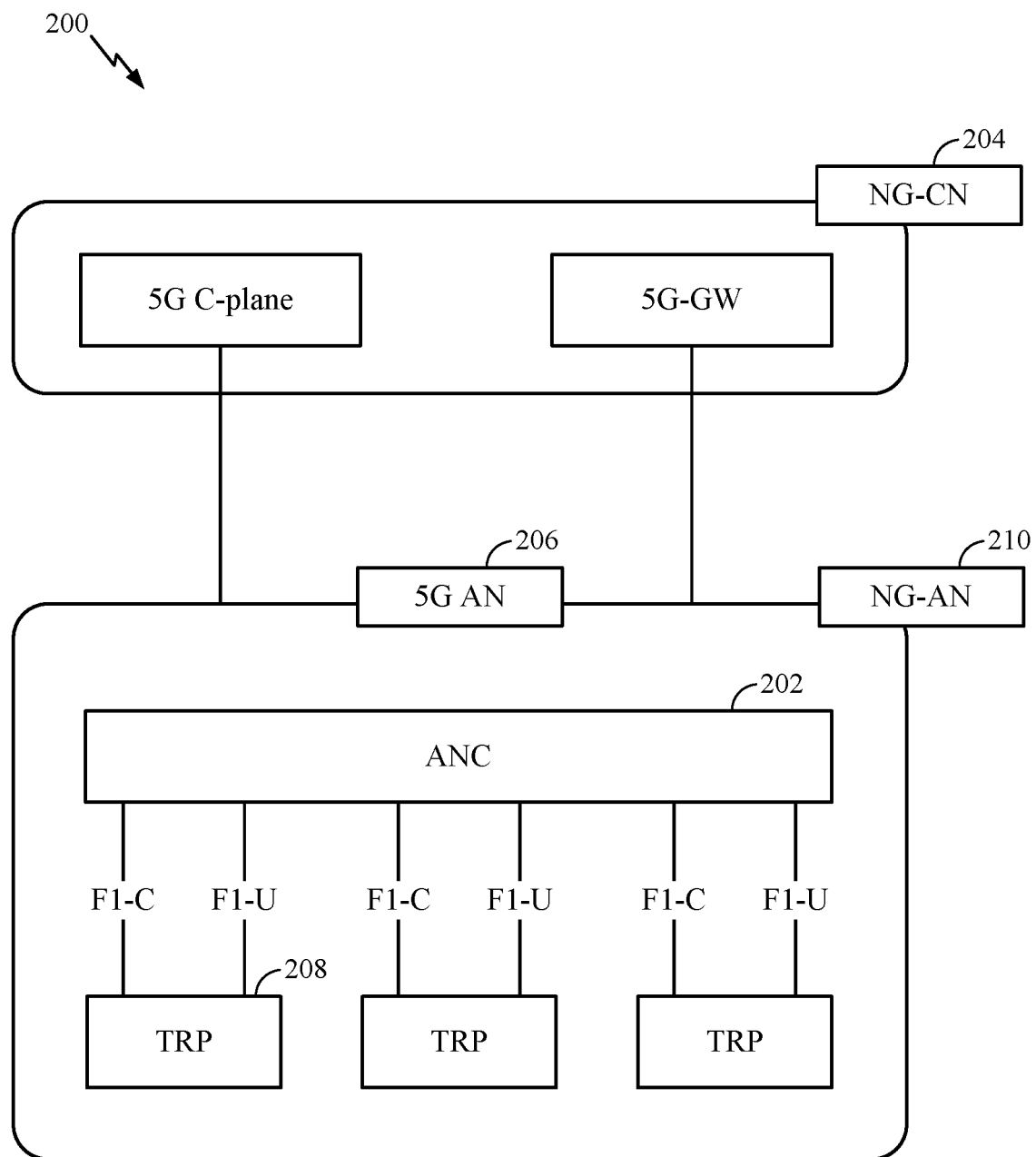
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
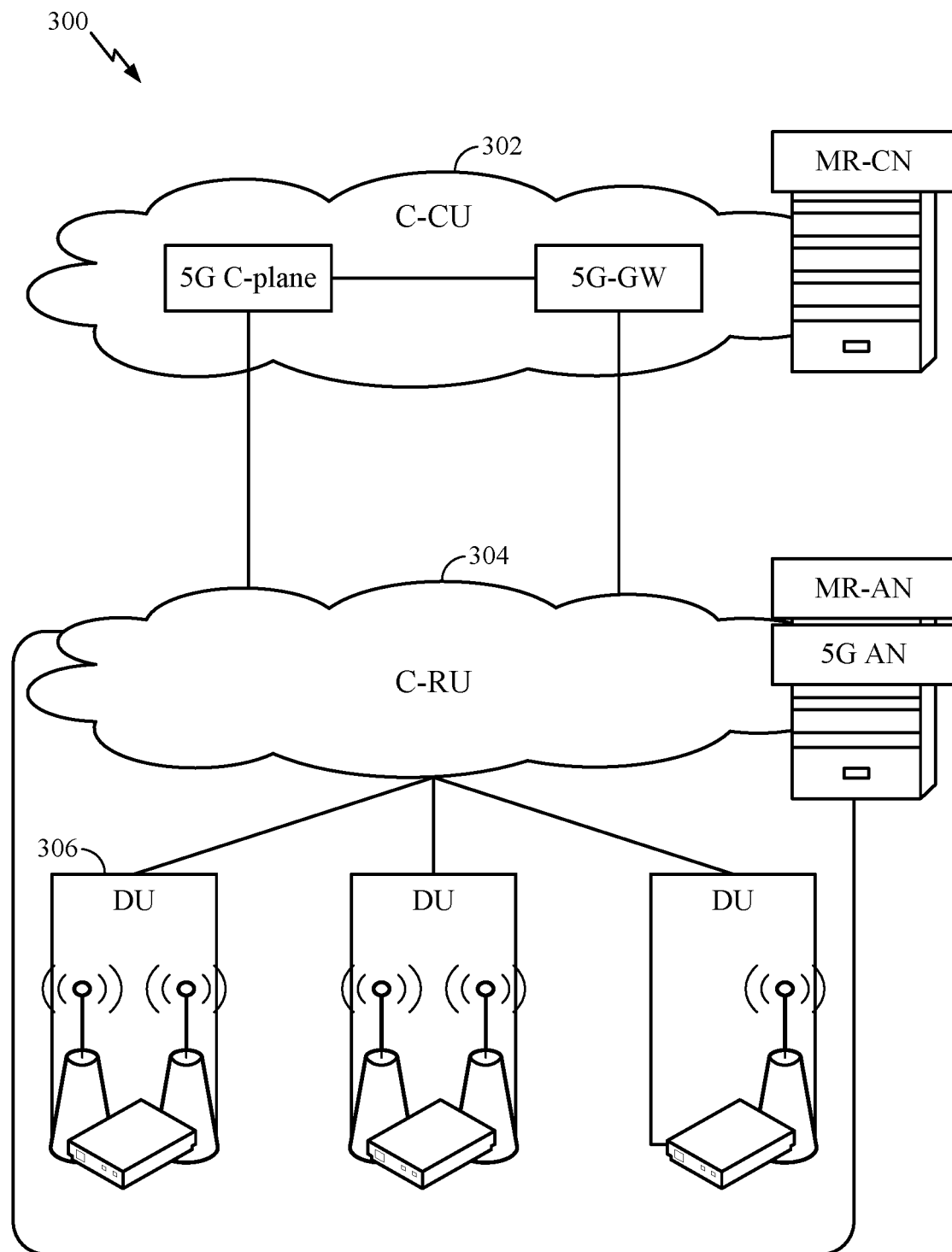
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
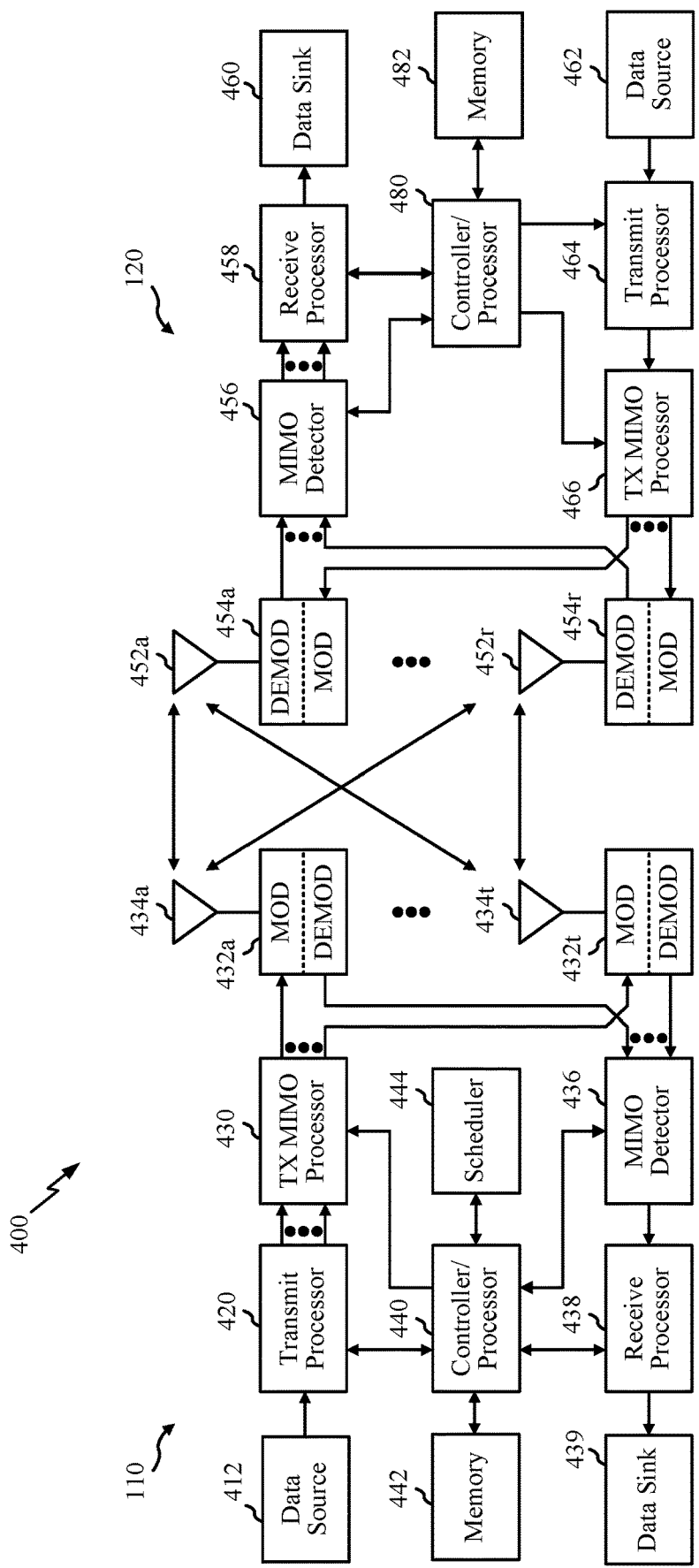
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct, e.g., the execution of the corresponding/complementary processes for the techniques described herein and as illustrated in FIG. 10. The memories 442 and 482 may store data and program codes for the BS 110 and the UE 120, respectively. A scheduler 444 may schedule UEs for data transmission on the downlink and/or uplink.

Figure 5:
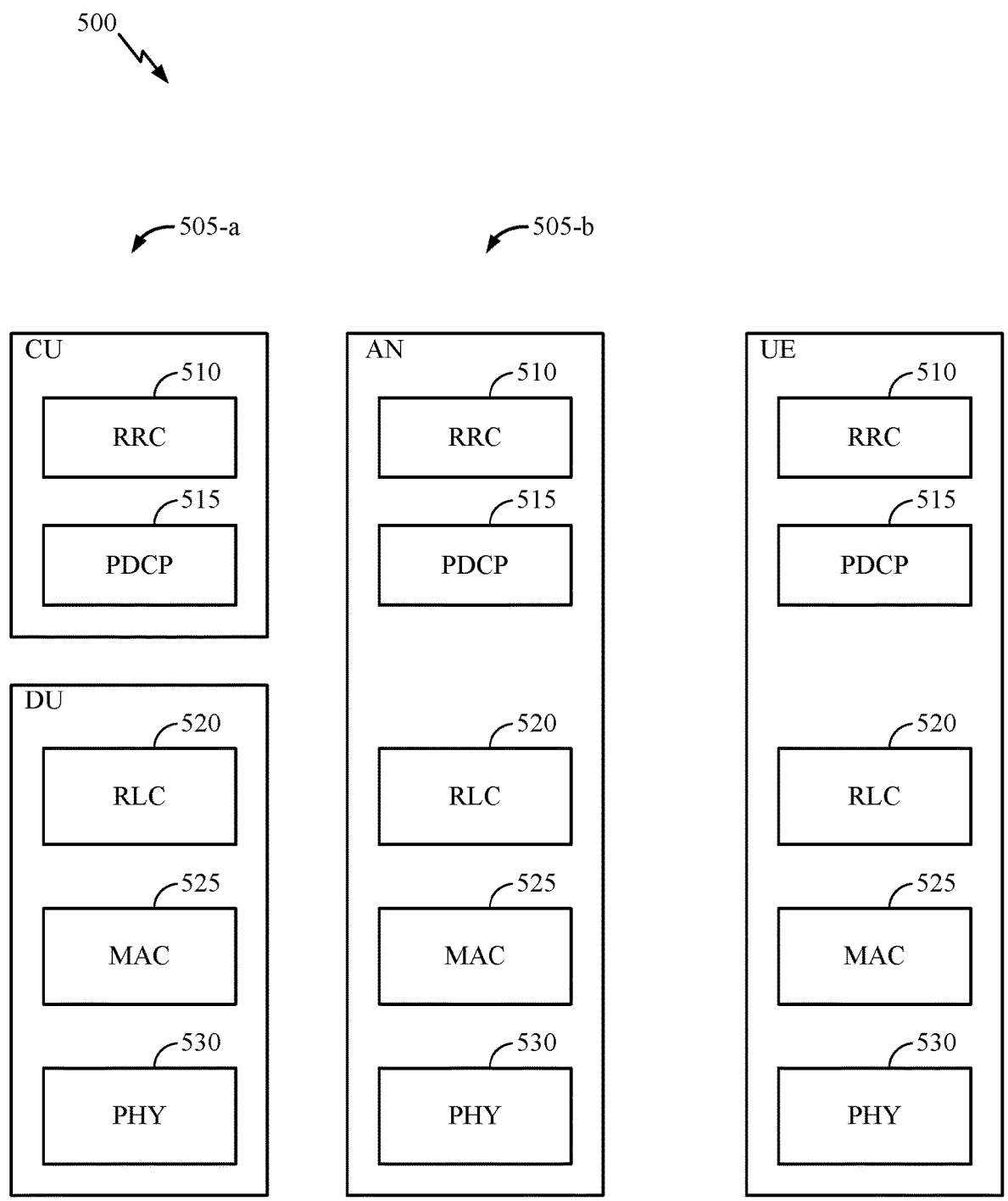
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
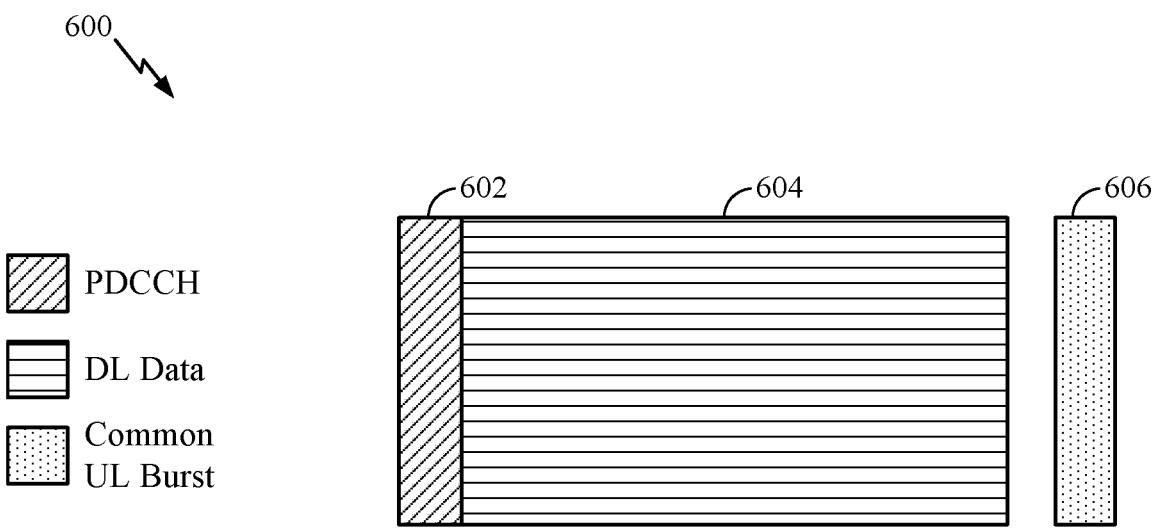
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
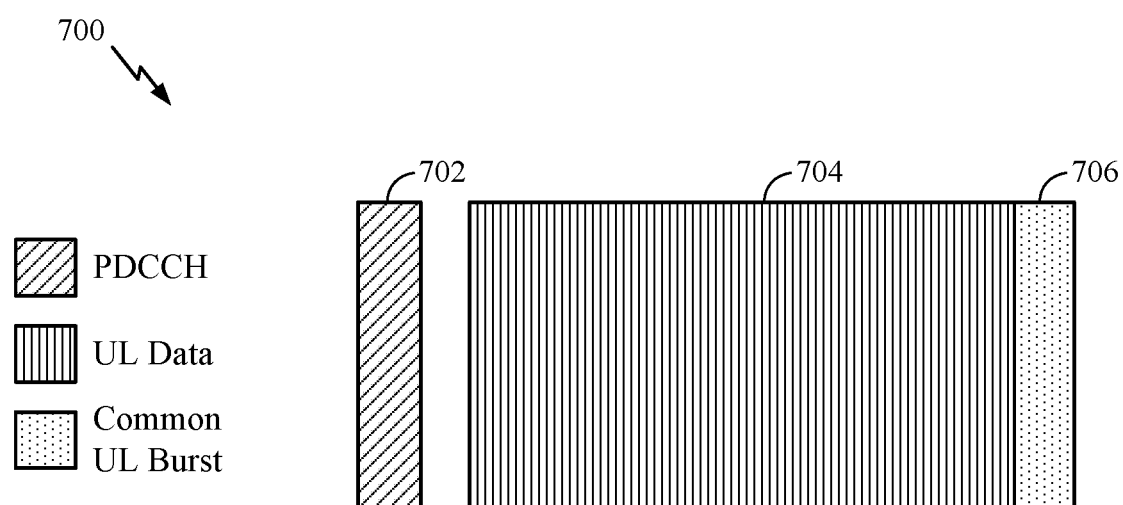
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof.

Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example MMWave Systems

As used herein, the term mmWave generally refers to spectrum bands in very high frequencies such as 28 GHz. However, aspects of the present disclosure apply to any type of beamformed system (e.g., including sub-6 GHz).

Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies which mmWave operates, the small wavelengths enable the use of a large number of antenna elements in a relatively small form factor. This characteristic of mmWave may be leveraged to form narrow directional beams that may send and receive more energy, which may help overcome the propagation/path loss challenges.

These narrow directional beams may also be utilized for spatial reuse. This is one of the key enablers for utilizing mmWave for mobile broadband services. In addition, the non-line-of-site (NLOS) paths (e.g., reflections from nearby building) may have very large energies, providing alternative paths when line-of-site (LOS) paths are blocked. Aspects of the present disclosure may take advantage of such directional beams, for example, by using sets of beams for beam and cell mobility management.

Some legacy wireless communication standards base UE mobility decisions on cell-specific reference signals (CRS) transmitted by serving and target BSs. For example, a CRS may be transmitted in a radio frame, a UE may measure the CRS, and the UE may report a reference signal receive power (RSRP) associated with the measured CRS to the BS. Because every cell may transmit a CRS, the measured RSRP may be "linked" to a cell. Measuring CRS from a serving cell and one or more non-serving cells may be used to make handover decisions.

In some wireless system, a serving BS may not regularly transmit a CRS. Instead, for example, a reference signal may be transmitted on-demand or as needed. Accordingly, mobility decisions a communication system employing beams may be based on one or more reference beams.

FIG. 8 illustrates an example of active beams 800, in accordance with aspects of the present disclosure. A BS and a UE may communicate using a set of active beams. Active beams may refer to BS and UE beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information. A control beam, which may serve more than one UE, may be broader than a data beam. A control/data beam UE-A1 may be used to transmit both control and data. As illustrated, both UL control and data are transmitted using a same beam; however, the data and control information may be transmitted using different beams. Similarly, data and control may be transmitted by the BS using different beams or a same beam.

In wireless communication systems employing beams, such as mmWave systems, high path loss may present a challenge. Accordingly, techniques including hybrid beamforming (analog and digital), which are not present in 3G and 4G systems, may be used in such wireless systems. Hybrid beamforming creates narrow beam patterns to users (e.g., UEs), which may enhance link budget/SNR. As described above, a BS and UE may communicate over active beams. Active beams may be referred to as serving beams. Active beams may include BS and UE beam pairs that carry data and control channels such as PDSCH, PDCCH, PUSCH, and PUCCH.

A BS may monitor beams using beam measurements and feedback from a UE. For example, a BS may monitor active beams using DL reference signals. A BS may transmit a DL RS, such as a narrowband reference signal (NRS), a demodulation reference signal (DMRS), a secondary synchronization signal (SSS), a measurement reference signal (MRS), a channel state information reference signal (CSI-RS), or a synchronization (synch) signal. A UE may report, to the BS, a reference signal receive power (RSRP) associated with a received reference signal. In this manner, the BS may monitor active beams.

Sets of active beams may have different functionalities, characteristics, and requirements. Stated otherwise, the functionalities of one or more active beams may be different than the functionalities other active beams. For example, a first set of active beams may include control beam and a second set of active beams may include data transmissions. As another example, beams in a first set of active beams may be transmitted in a first direction and beams in a second set of active beams may be transmitted in a second direction, different than the first direction. During multi-link communication, a UE may simultaneously be connected to a first BS in the first direction and to a second BS in the second direction. Beam shapes for each beam set of the active beams may vary. For example, as described above, the shape of control beams from a BS may be different than a shape of data beams from the same base station.

Example UE Reporting of Rx Beam Change Indication

Thus, aspects of the present disclosure provide methods and apparatus for reporting of a receive (Rx) beam change indication, as well as base station-side operations for configuring and using such reporting.

The techniques presented herein may help address the unique challenges in some wireless systems caused by potentially high path loss. These challenges have prompted new techniques, such as hybrid beamforming (analog and digital). As described above, hybrid beamforming may create beam pattern to users that may enhance link budget/SNR.

Aspects of the present disclosure provide a mechanism, that may be used in multi-beam operation, for a UE to indicate receive (Rx) beam change information for one or more base station (NodeB or just NB) Tx beams for reception for subsequent (beamformed) communication.

According to certain aspects, UE measurements (used for Rx beam selection) may be performed on RS that are cell-specific or UE configured. RS transmission may occur in SS block, control or data block. Measurements of RS or other signals may be used to derive an indication of a change in Rx beam, which may be sent from the UE to the NB. This indication/report may be used by the NB to determine NB Tx beam(s) to schedule users (which may or may not include the UE reporting the change indication) and determine if the NB should send a Tx beam switch indication itself.

In accordance with one or more aspects, a UE may be configured to measure several BS beams with the same Rx-beam and report about such measurements. This may enable a BS to switch beams in a UE transparent manner. UE may also be configured to report Rx-beam changes (e.g. as a result of a change of channel). A BS may use this reporting of the Rx-beam changes to change its beams accordingly. In accordance with one or more cases, the UE may use a variety of different signaling to indicate that the UE has switched the beam. In some cases, a BS may be able to disable switching and other such configurability features of a UE such as making a report based on only one beam and initial access.

Figure 9:
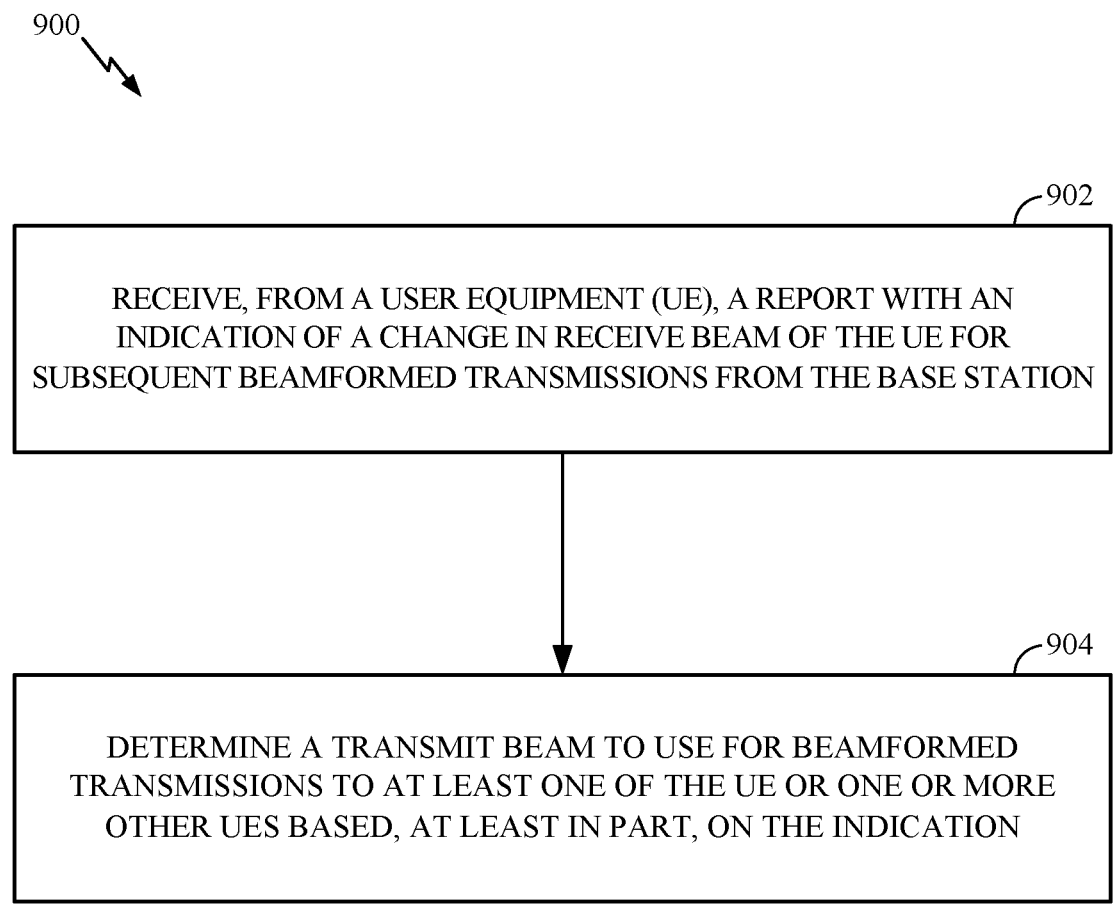
FIG. 9 example operations performed by a BS, in accordance with certain aspects of the present disclosure.
Figure 10:
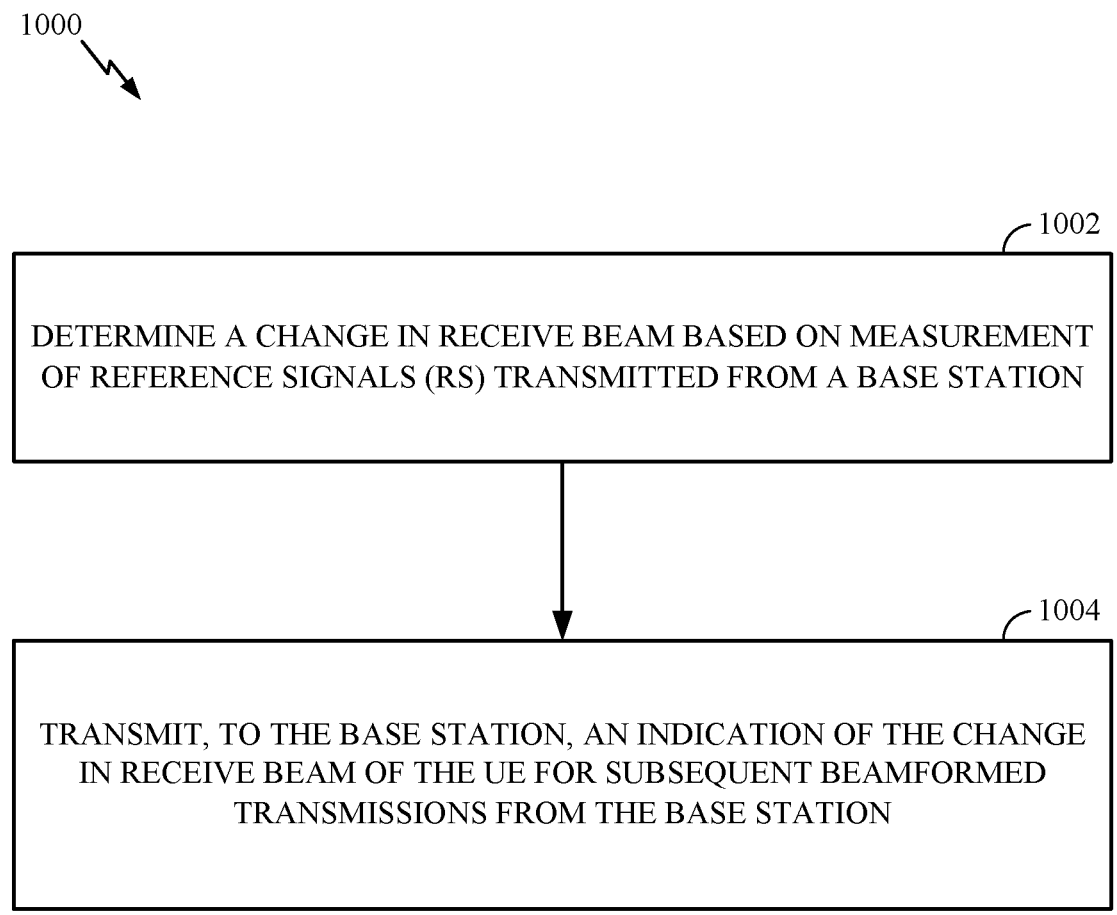
FIG. 10 illustrates example operations performed by a UE, in accordance with certain aspects of the present disclosure.

FIG. 9 illustrates example operations 900 that may be performed by a BS (e.g. a NB). The BS may include one or more modules of the BS 110 illustrated in FIG. 4.

Operations 900 begin, at 902, by receiving, from a user equipment (UE), a report with an indication of a change in receive beam of the UE for subsequent beamformed transmissions from the base station.

As will be described below, the change in Rx beam may be based on measurements, at the UE, of RS transmitted by the BS. NB transmissions of RS may be cell-specific RS or per-UE configured. Transmission may occur in SS block or in control/data region.

At 904, the BS determining a transmit beam to use for beamformed transmissions to at least one of the UE or one or more other UEs based, at least in part, on the indication. For example, based on the indicated change in Rx beam, the BS may determine what beams to use for subsequent transmissions to the UE reporting the indication or one or more other UEs.

FIG. 10 illustrates example operations 1000 which may be performed by UE, according to aspects of the present disclosure. The UE may include one or more modules of the UE 120 illustrated in FIG. 4.

Operations 1000 begin, at 1002, by determining a change in receive beam based on measurement of reference signals (RS) transmitted from a base station. At 1004, the UE transmits, to the base station, an indication of the change in receive beam of the UE for subsequent beamformed transmissions from the base station.

In some cases, a base station may configure a UE for reporting/indicating a change in Rx beam. For example, a NB may enable or disable such reporting via broadcast signaling (e.g., via a MIB, minimum SI, or other SI), via L1/L2 signaling, or via radio resource control (RRC) signaling.

In some cases, a NB may configure the UE with various parameters to use for measuring RS and selecting, and/or deciding when to report a change in Rx beam. For example, a NB may configure a UE with a specific threshold (e.g., threshold1) for signal quality metrics (E.g. RSRP, SNR, etc.) to determine suitability or unsuitability (and/or reporting/not reporting) using a UE Rx beam.

In some cases, the NB may also configure how the UE reports a change in Rx beam. For example, the NB may specify that the UE is to report using MAC-CE or UCI.

In some cases, the NB may also specify how the UE is to measure RS for Rx beam selection. For example, the NB may specify the UE is to use the same Rx beam for measurement of one or more RS signals. Such a configuration may be specified, for example, in terms of a beam id, or start and end time (e.g., in terms of slots/minislots or slots/minislots of a subframe/frame).

In one or more cases, configuration information may be sent by a NB to a UE via a handover command. For example, when a user is moving from a serving cell to a target cell, a target cell may create the handover command and send the handover command to the serving cell which then goes to the UE. The handover command may comprise the configuration information for the transmission of reference signals and for reporting. Accordingly, the UE may be prepared as soon as it moves to the target cell to begin measurements and transmissions. In some cases, the UE may use the received configuration information to begin performing measurements prior to sending a message 1 (Msg 1) and may then provide those measurements in Msg 1 or a later transmission. In one or more cases, the configuration information may be sent over another transmission such as, for example, a message 2 (Msg 2) transmission. The configuration information may be conveyed via at least one of a master information block (MIB), a system information block (SIB), or radio resource control (RRC) signaling In other cases, an NB may not configure the UE. Rather the UE may self-determine for certain scenarios, such as during RACH.

UE reports for an Rx change indication may comprise various information. For example, such reports may include a beam ID, signal quality (RSRP, RSRQ, SNR, SINR, etc.) and/or an explicit Rx beam change indication.

In one example, the UE measures one or more NB Tx beams using same UE RX beam. If the difference in signal quality observed between a strongest beam and one or more of other beams is less than a threshold, then the UE may report one or more beams that satisfy the do satisfy the threshold criteria. Because, in this example, the UE Rx beam does not change, the NB may choose to use one of the multiple beams reported by the UE to schedule (other) users.

FIG. 11A illustrates such an example, in which the UE measures two different NB Tx beams (NB-B1 and NB-B2 used to transmit Msg 2 and RS) using the same Rx beam (UE-B1). As illustrated, if the absolute value of the difference in RSRP is below threshold 1, the UE may report RSRP of both beams. Based on the report, the NB may choose either Tx beam (for transmitting Msg 4).

In another example, a UE may measure one or more NB Tx beams using the same UE Rx beam. If the difference in signal quality between strongest and others is greater than a threshold, then the UE may report the strongest and also indicate that others are not suitable for subsequent communication. In this example, because the UE Rx beam changes, the NB may choose to use the strongest NB Tx beam for subsequent communication. Also, because the UE Rx beam changes, the NB may choose to send a beam switch indication to the UE.

FIG. 11B illustrates such an example, in which the UE measures two different NB Tx beams (NB-B1 and NB-B2 used to transmit Msg 2 and RS) using two different Rx beams (UE-B1 and UE-B2). As illustrated, if the absolute value of the difference in RSRP is above threshold 1, the UE may report RSRP of the strongest and may also provide an explicit beam change indication. Assuming NB-B2 is the strongest in this example, the NB may choose MB-B2 as the Tx beam for transmitting Msg 4 (and the UE may use UE-B2 as the Rx beam).

Reporting an indication of a change in Rx beam, as described herein, may help prevent certain ambiguities in multi-beam operations that may result in sub-optimal performance. Such ambiguities may be described as follows.

In general, in multipath/non-line-of-sight scenarios, the best Rx beam will be a function of Tx beam. Thus, when a UE has to measure and report on multiple NodeB Tx beams, the optimal performance may be achieved if the UE compared the Tx beams by using the best possible Rx beam for each of them. In a scheme where the UE does this comparison and then reports the best Tx beam, and the NodeB chooses that beam for subsequent transmission, then the UE may use the associated best Rx beam for receiving subsequent transmissions.

However, UE may report the best N Tx beams with N>1, and NodeB may be free to choose from among these, based on other considerations (e.g., using a common beam to serve multiple UEs simultaneously by FDM). In this case, there is ambiguity at the UE as to the Rx beam to be used to receive subsequent transmissions from the NodeB, if the best N Tx beams were associated with different Rx beams.

One way to avoid this ambiguity is to use a common Rx beam for measuring all the N Tx beams, as described above. This approach may help avoid longer training used to identify the best Rx beam for each Tx beam. However, this may also be suboptimal, for example, resulting in an unfair bias in favor of a Tx beam towards which the chosen common Rx beam was better suited. Another approach is for the UE to include in a measurement report, some information about the Rx beam that was used to measure each Tx beam. This information may indicate, for example, the Rx beam that the UE will use to receive the next NodeB transmissions (e.g., this may be the one corresponding to the best Tx beam in the report). The NodeB may then use this information to estimate the consequence of selecting a different Tx beam. In one or more cases, the measurement report from a UE may comprise signal quality information of a measured reference signal (RS). For example, the measurement report may include one or more of a RS receive power (RSRP), a RS signal to noise ratio (RS-SNR), a RS received quality (RSRQ), and/or other related information in addition to a beam indication.

The Rx beam change indication described above is an example of this additional Rx beam related information that may be conveyed in a measurement report. This may represent a single bit which, if set, tells the NodeB that the newly identified Rx beam results in much improved performance and, because the UE will use that Rx beam for subsequent transmission, the NodeB may interpret this indication as a recommendation to use the associated Tx beam.

The Rx beam information may be, however, more general than an 'Rx beam change bit'. For example, the Rx beam information may indicate information about the Rx beam used for each Tx beam in the measurement. For example, the measurements may be grouped by Rx beam ID, and additional information may distinguish the different beam IDs, for example, specifying a different beam angle/orientation for each beam ID. This approach may provide the NodeB with an indication of which Rx beams are close to each other and, thus, may serve as an estimate of the sub-optimality if the NodeB chooses not to use the strongest Tx beam in the report.

The extent of Rx beam information conveyed may be different during RACH in Message3 and in connected mode. To avoid overhead in Message3 and preserve RACH link budget, for example, fewer bits may be used in Message3.

In some cases, the Rx beam change may be specified relative to a known reference (e.g., a reference known both to NB and UE). For example, during RACH procedure, Msg3 may be transmitted multiple times. The first Msg3 may indicate the Rx beam change relative to the "last" PRACH transmission, because Msg1 may be transmitted multiple times also before the NodeB sends Msg 2 to this UE.

In one or more cases, a method for wireless communication by a base station, may include receiving, from a user equipment (UE), a report with an indication of a change in receive beam of the UE for subsequent beamformed transmissions from the base station, and determining a transmit beam to use for beamformed transmissions to at least one of the UE or one or more other UEs based, at least in part, on the indication. The report may comprise a beam ID and indication of signal quality for at least the change in receive beam. The base station may schedule the one or more other UEs based on the indication.

The change in receive beam may be determined based on reference signals (RS) transmitted by the base station. The RS may include cell-specific RS. The RS may be transmitted in at least one of a block of synchronization signal (SS) resources, a control region, or a data region. The indication may indicate a change in receive beam corresponding to one or more transmit beams of the base station.

The method may further include conveying configuration information to the UE for providing the indication. The configuration information may be conveyed via at least one of a master information block (MIB), a system information block (SIB), or radio resource control (RRC) signaling. The configuration information may indicate one or more signal quality metrics for the UE to use for determining when to send the indication of the change in receive beam. The configuration information may indicate how the UE is to report the indication of the change in receive beam. The configuration information may indicate at least one receive beam for the UE to use when measuring reference signals (RS) to use in deciding on a receive beam. The configuration information may indicate at least one of a beam id, a start time, or an end time for measuring the RS.

The indication of the change in receive beam may be based on measurement of reference signals (RS) transmitted on all transmit beams of the base station using a common receive beam of the UE. The report may further include a measurement report that includes information about the receive beam of the UE used to measure each transmit beam. The information may indicate the receive beam that the UE will use to receive base station transmissions, wherein the receive beam corresponds to a transmit beam in the measurement report.

The base station may configure the UE with a threshold for signal quality metrics to determine suitability or unsuitability and whether to transmit the report with the indication of the change in receive beam of the UE. The signal quality metrics may include one or more of RSRP and/or SNR.

In one or more cases a base station may include means for receiving, from a user equipment (UE), a report with an indication of a change in receive beam of the UE for subsequent beamformed transmissions from the base station, and means for determining a transmit beam to use for beamformed transmissions to at least one of the UE or one or more other UEs based, at least in part, on the indication. The report may comprise a beam ID and indication of signal quality for at least the change in receive beam. The base station may schedule the one or more other UEs based on the indication.

The change in receive beam may be determined based on reference signals (RS) transmitted by the base station. The RS may include cell-specific RS. The RS may be transmitted in at least one of a block of synchronization signal (SS) resources, a control region, or a data region. The indication may indicate a change in receive beam corresponding to one or more transmit beams of the base station.

The base station may further include means for conveying configuration information to the UE for providing the indication. The configuration information may be conveyed via at least one of a master information block (MIB), a system information block (SIB), or radio resource control (RRC) signaling. The configuration information may indicate one or more signal quality metrics for the UE to use for determining when to send the indication of the change in receive beam. The configuration information may indicate how the UE is to report the indication of a change in receive beam. The configuration information may indicate at least one receive beam for the UE to use when measuring reference signals (RS) to use in deciding on a receive beam. The configuration information may indicate at least one of a beam id, a start time, or an end time for measuring the RS.

The indication of the change in receive beam may be based on measurement of reference signals (RS) transmitted on all transmit beams of the base station using a common receive beam of the UE. The report may further include a measurement report that includes information about the receive beam of the UE used to measure each transmit beam. The information may indicate the receive beam that the UE will use to receive base station transmissions, wherein the receive beam corresponds to a transmit beam in the measurement report.

The base station may configure the UE with a threshold for signal quality metrics to determine suitability or unsuitability and whether to transmit the report with the indication of the change in receive beam of the UE. The signal quality metrics may include one or more of RSRP and/or SNR.

In one or more cases, a base station may include a receiver configured to receive, from a user equipment (UE), a report with an indication of a change in receive beam of the UE for subsequent beamformed transmissions from the base station, and at least one processor configured to determine a transmit beam to use for beamformed transmissions to at least one of the UE or one or more other UEs based, at least in part, on the indication.

In some cases, a computer readable medium having instructions stored thereon may be provided for receiving, from a user equipment (UE), a report with an indication of a change in receive beam of the UE for subsequent beamformed transmissions and determining a transmit beam to use for beamformed transmissions to at least one of the UE or one or more other UEs based, at least in part, on the indication.

The methods described herein may include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   determining a change in a receive beam based on measurement of a reference signal (RS) transmitted via a transmit beam from a base station; and
   transmitting, to the base station, an indication of the change in the receive beam of the UE for subsequent beamformed transmissions from the base station and, including in a measurement report along with the indication, information about the receive beam of the UE used to measure the transmit beam.

2. The method of claim 1, wherein the indication comprises a beam ID and an indication of signal quality for at least the change in the receive beam.

3. The method of claim 1, wherein the RS comprises cell-specific RS.

4. The method of claim 1, wherein the RS is transmitted in at least one of a block of synchronization signal (SS) resources, a control region, or a data region.

5. The method of claim 1, wherein the indication indicates the change in the receive beam corresponds to one or more transmit beams of the base station.

6. The method of claim 1, further comprising receiving configuration information from the base station for providing the indication.

7. The method of claim 6, wherein the configuration information is received via at least one of a master information block (MIB), a system information block (SIB), or radio resource control (RRC) signaling.

8. The method of claim 6, wherein the configuration information indicates one or more signal quality metrics for the UE to use for determining when to send the indication of the change in the receive beam.

9. The method of claim 6, wherein the configuration information indicates how the UE is to report the indication of a change in the receive beam.

10. The method of claim 6, wherein the configuration information indicates at least one receive beam for the UE to use when measuring the reference signals (RS) when determining the change in the receive beam.

11. The method of claim 10, wherein the configuration information indicates at least one of a beam id, a start time, or an end time for measuring the RS.

12. The method of claim 1, wherein determining the change in the receive beam based on measurement of RS transmitted from the base station further comprises:
using a common receive beam of the UE for measuring all transmit beams of the base station.

13. The method of claim 1, wherein the information further indicates the receive beam that the UE will use to receive base station transmissions, wherein the receive beam corresponds to the transmit beam in the measurement report.

14. The method of claim 1, wherein the UE includes a threshold for signal quality metrics to determine suitability or unsuitability and whether to transmit the indication of the change in the receive beam of the UE.

15. A user equipment (UE), comprising:
means for determining a change in a receive beam based on measurement of a reference signal (RS) transmitted via a transmit beam from a base station; and
means for transmitting, to the base station, an indication of the change in the receive beam of the UE for subsequent beamformed transmissions from the base station and, including in a measurement report along with the indication, information about the receive beam of the UE used to measure the transmit beam.

16. The UE of claim 15, wherein the indication comprises a beam ID and an indication of signal quality for at least the change in the receive beam.

17. The UE of claim 15, wherein the indication indicates the change in the receive beam corresponds to one or more transmit beams of the base station.

18. The UE of claim 15, further comprising means for receiving configuration information from the base station for providing the indication.

19. The UE of claim 18, wherein the configuration information is received via at least one of a master information block (MIB), a system information block (SIB), or radio resource control (RRC) signaling.

20. The UE of claim 18, wherein the configuration information indicates one or more signal quality metrics for the UE to use for determining when to send the indication of the change in the receive beam.

21. The UE of claim 18, wherein the configuration information indicates how the UE is to report the indication of the change in the receive beam.

22. The UE of claim 18, wherein the configuration information indicates at least one receive beam for the UE to use when measuring the reference signals (RS) when determining the change in the receive beam.

23. The UE of claim 22, wherein the configuration information indicates at least one of a beam ID, a start time, or an end time for measuring the RS.

24. The UE of claim 15, wherein means for determining the change in the receive beam based on measurement of RS transmitted from the base station further comprises:
means for using a common receive beam of the UE for measuring all transmit beams of the base station.

25. The UE of claim 15, wherein the information indicates the receive beam that the UE will use to receive base station transmissions, wherein the receive beam corresponds to the transmit beam in the measurement report.

26. The UE of claim 15, wherein the UE includes a threshold for signal quality metrics to determine suitability or unsuitability and whether to transmit the indication of the change in the receive beam of the UE.

27. A user equipment (UE), comprising:
at least one processor configured to determine a change in a receive beam based on measurement of a reference signal (RS) transmitted via a transmit beam from a base station; and
a transmitter configured to transmit, to the base station, an indication of the change in the receive beam of the UE for subsequent beamformed transmissions from the base station and, including in a measurement report along with the indication, information about the receive beam of the UE used to measure the transmit beam.

28. A non-transitory computer readable medium having instructions stored thereon, the instructions executable by a processor of a user equipment (UE), causing the UE to perform a method comprising: determining a change in a receive beam based on measurement of a reference signal (RS) transmitted via a transmit beam from a base station; and transmitting, to the base station, an indication of the change in the receive beam for subsequent beamformed transmissions from the base station and, including in a measurement report along with the indication, information about the receive beam of the UE used to measure the transmit beam.

* * * * *